United States Patent
Dominguez et al.

(10) Patent No.: US 12,257,957 B2
(45) Date of Patent: Mar. 25, 2025

(54) VEHICLE TRIM COMPONENT ATTACHMENT

(71) Applicant: GM GLOBAL TECHNOLOGY OPERATIONS LLC, Detroit, MI (US)

(72) Inventors: Jesus Edgar Dominguez, Cuernavaca (MX); Leon Alfonso Alvarez, Toluca (MX); Alejandro Barrera, Metepec (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 338 days.

(21) Appl. No.: 17/872,221

(22) Filed: Jul. 25, 2022

(65) Prior Publication Data
US 2024/0025353 A1    Jan. 25, 2024

(51) Int. Cl.
*B60R 13/02*       (2006.01)

(52) U.S. Cl.
CPC ............................. *B60R 13/0206* (2013.01)

(58) Field of Classification Search
None
See application file for complete search history.

(56) References Cited

U.S. PATENT DOCUMENTS

| | | | |
|---|---|---|---|
| 7,874,048 B2* | 1/2011 | Katoh | F16B 21/073 24/453 |
| 10,124,745 B2* | 11/2018 | Del Pozo Gonzalez | B60R 13/0206 |
| 2005/0034282 A1 | 2/2005 | Kurily et al. | |
| 2005/0155191 A1* | 7/2005 | Asano | F16B 5/0664 24/297 |
| 2020/0079297 A1* | 3/2020 | Dominguez Cuevas | B60R 13/0243 |

FOREIGN PATENT DOCUMENTS

EP       1911980 A1    4/2008

OTHER PUBLICATIONS

German Office Action for German Application No. 102022134841.5; dated Oct. 11, 2023; 7 pages.

* cited by examiner

*Primary Examiner* — Joseph D. Pape
(74) *Attorney, Agent, or Firm* — CANTOR COLBURN LLP

(57) ABSTRACT

A trim assembly of a vehicle includes a first trim piece, a second trim piece, and a clip extending from the first trim piece. The clip has a base portion located at the first trim piece and a tip portion. A clip opening is located at the second trim piece. The clip opening has a complimentary shape into which the clip is installed. The clip opening includes a plurality of opening tabs, each opening tab of the plurality of opening tabs is engaged with a retention feature of the clip to retain the clip in the clip opening.

16 Claims, 5 Drawing Sheets

VEHICLE TRIM COMPONENT ATTACHMENT

INTRODUCTION

The subject disclosure relates to securing of plastic trim components in a vehicle. Vehicles include numerous plastic trim pieces in an interior of the vehicle, that are attached to other plastic trim pieces and/or directly to the vehicle body. One such area of the vehicle is the door assembly. In the door assembly, a variety of attachment means are utilized, such as heat stakes and screws. These attachments, however, require weld machines, torque machines, or fastener installer machines which require electrical power. It is desired to reduce the use of such complex and powered machines for assembly of the components, while achieving similar performance with the attachments.

SUMMARY

In one embodiment, a trim assembly of a vehicle includes a first trim piece, a second trim piece, and a clip extending from the first trim piece. The clip has a base portion located at the first trim piece and a tip portion. A clip opening is located at the second trim piece. The clip opening has a complimentary shape into which the clip is installed. The clip opening includes a plurality of opening tabs, each opening tab of the plurality of opening tabs is engaged with a retention feature of the clip to retain the clip in the clip opening.

Additionally or alternatively, in this or other embodiments the clip includes a plurality of clip sides extending from the base portion to the tip portion and a side opening defined in each clip side of the plurality of clip sides. Each opening tab of the plurality of opening tabs is inserted into a corresponding side opening to retain the clip in the clip opening.

Additionally or alternatively, in this or other embodiments the plurality of opening tabs are flexible to reduce an insertion force of the clip into the clip opening.

Additionally or alternatively, in this or other embodiments the insertion force is 10 pounds force or less.

Additionally or alternatively, in this or other embodiments the clip opening includes an opening central portion into which the clip is installed and a plurality of opening branch portions extending from the opening central portion. Each opening branch portion includes an opening tab of the plurality of opening tabs extending toward the opening central portion.

Additionally or alternatively, in this or other embodiments a retention force of the clip in the clip opening is 50 pounds force or greater.

Additionally or alternatively, in this or other embodiments the clip is one of a circular or polygonal shape.

Additionally or alternatively, in this or other embodiments the clip is formed integral with the first trim piece.

Additionally or alternatively, in this or other embodiments one or more reinforcing ribs extend from the first trim piece to the clip.

Additionally or alternatively, in this or other embodiments a base cross-sectional area of the base portion is greater than a tip cross-sectional area of the tip portion.

In another embodiment, a door assembly of a vehicle includes a door inner panel, and a door trim assembly installed to the door inner panel. The door trim assembly includes a first trim piece, a second trim piece and a clip extending from the first trim piece. The clip has a base portion located at the first trim piece and a tip portion. A clip opening is located at the second trim piece. The clip opening has a complimentary shape into which the clip is installed. The clip opening includes a plurality of opening tabs. Each opening tab of the plurality of opening tabs is engaged with a retention feature of the clip to retain the clip in the clip opening.

Additionally or alternatively, in this or other embodiments the clip includes a plurality of clip sides extending from the base portion to the tip portion and a side opening defined in each clip side of the plurality of clip sides. Each opening tab of the plurality of opening tabs is inserted into a corresponding side opening to retain the clip in the clip opening.

Additionally or alternatively, in this or other embodiments the plurality of opening tabs are flexible to reduce an insertion force of the clip into the clip opening.

Additionally or alternatively, in this or other embodiments the insertion force is 10 pounds force or less.

Additionally or alternatively, in this or other embodiments the clip opening includes an opening central portion into which the clip is installed and a plurality of opening branch portions extending from the opening central portion. Each opening branch portion includes an opening tab of the plurality of opening tabs extending toward the opening central portion.

Additionally or alternatively, in this or other embodiments a retention force of the clip in the clip opening is 50 pounds force or greater.

Additionally or alternatively, in this or other embodiments the clip is one of a circular or polygonal shape.

Additionally or alternatively, in this or other embodiments the clip is formed integral with the first trim piece.

Additionally or alternatively, in this or other embodiments one or more reinforcing ribs extend from the first trim piece to the clip.

Additionally or alternatively, in this or other embodiments a base cross-sectional area of the base portion is greater than a tip cross-sectional area of the tip portion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
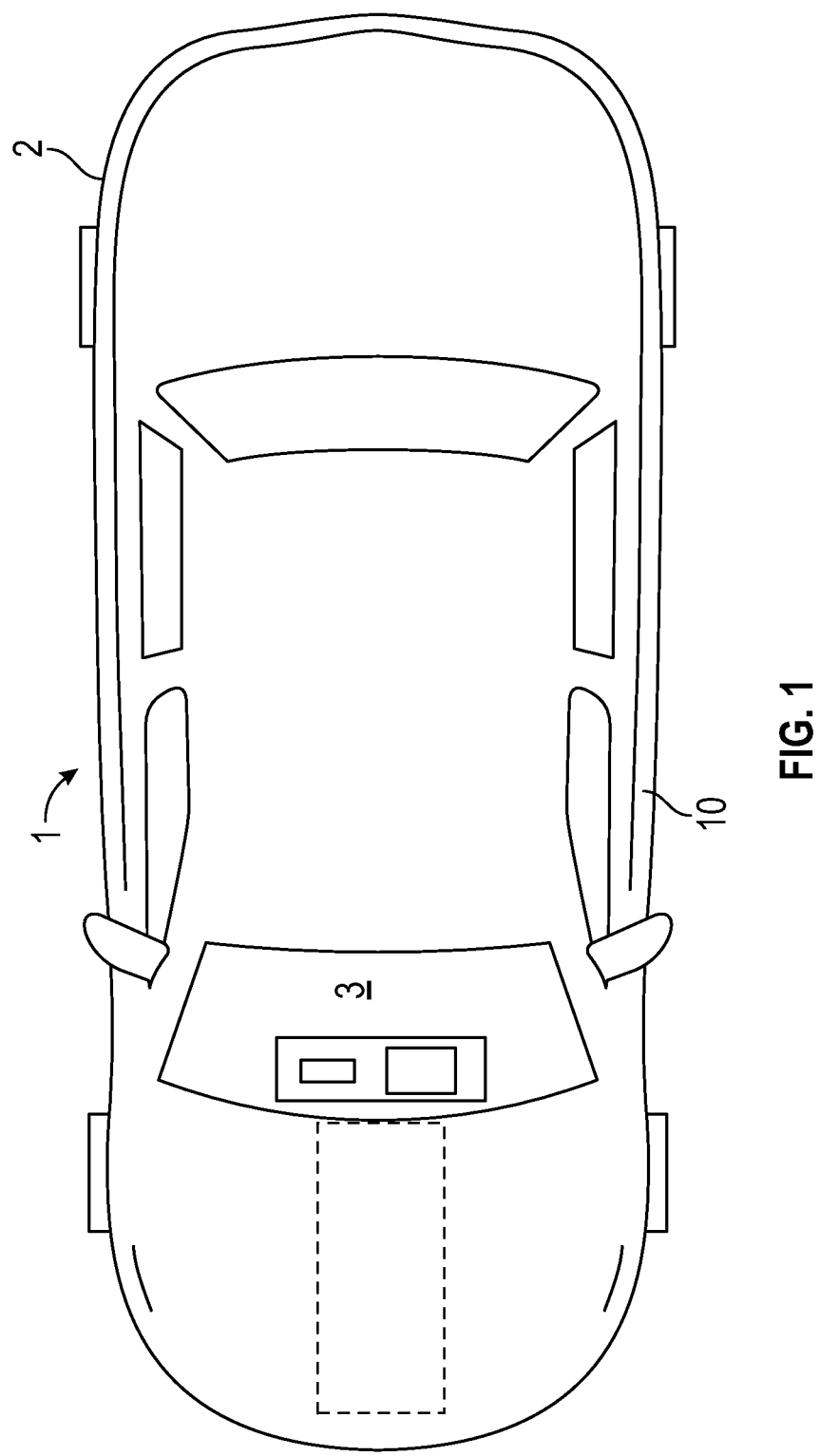
FIG. 1 is an illustration of an embodiment of a vehicle.

The following description is merely exemplary in nature and is not intended to limit the present disclosure, its application or uses. It should be understood that throughout the drawings, corresponding reference numerals indicate like or corresponding parts and features.

Figure 2:
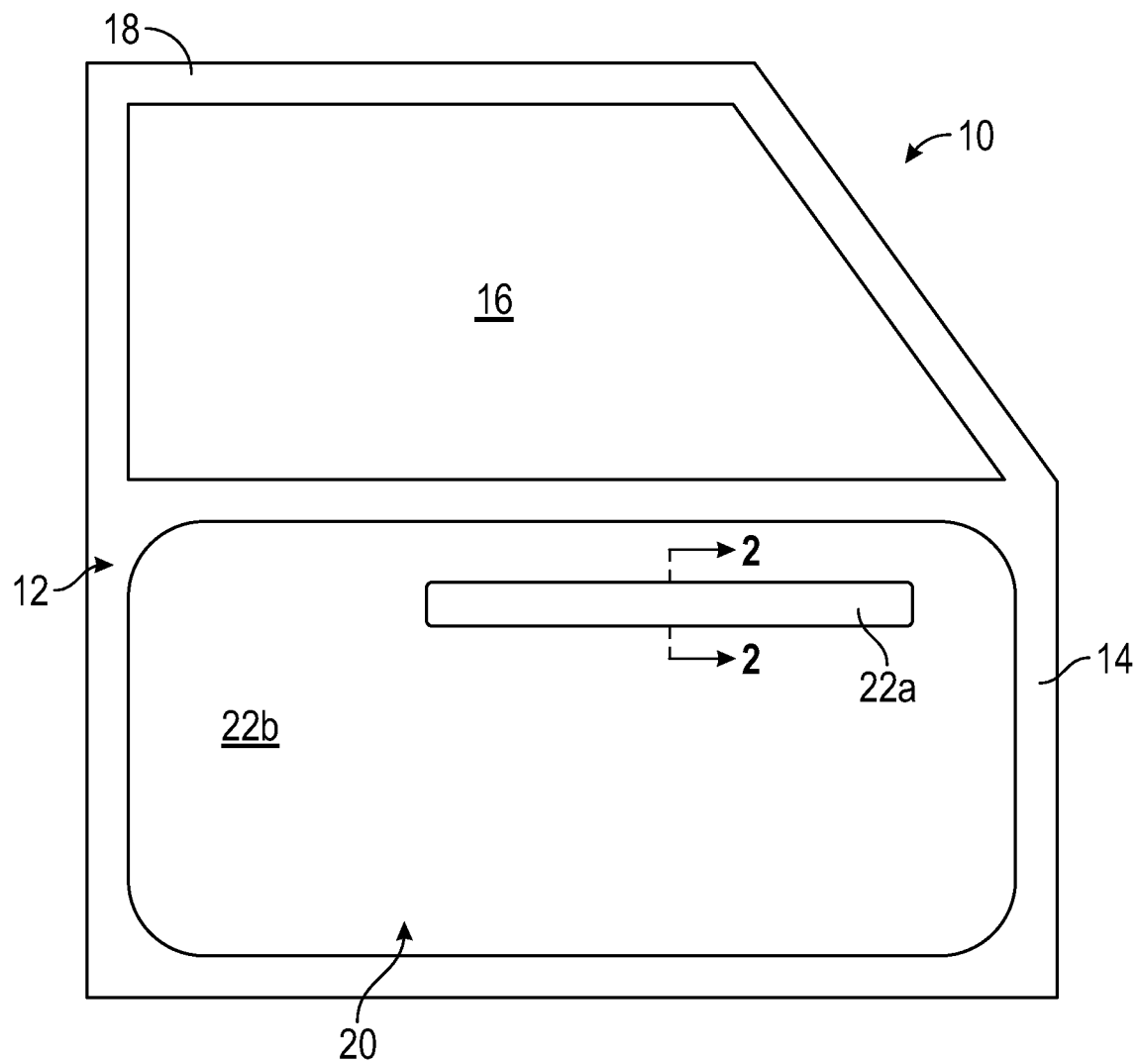
FIG. 2 is an illustration of an embodiment of a door assembly of a vehicle.

In accordance with an exemplary embodiment, illustrated is an embodiment of a vehicle 1. The vehicle 1 includes a vehicle body 2, which defines an occupant compartment 3 in an interior of the vehicle 1. One or more door assemblies 10 provide access into the occupant compartment. Referring now to FIG. 2, illustrated is an embodiment of a door assembly 10. The door assembly 10 includes a door 12 having a door inner panel 14, and in some embodiments at least partially defining a window opening 16 via a door frame 18. In some embodiments, the door inner panel 14 is formed from, for example, stamped metal or composite material, and the door frame 18 is similarly formed from a metal or composite material. A door trim assembly 20 is attached to the door inner panel 14, and includes one or more trim pieces 22a and 22b (referred to generally as 22) attached directly to the door inner panel 14 and/or attached to other trim pieces 22. The door trim pieces 22 may be formed from, for example, one or more of plastic, fabric, wood, or metal materials.

Figure 3:
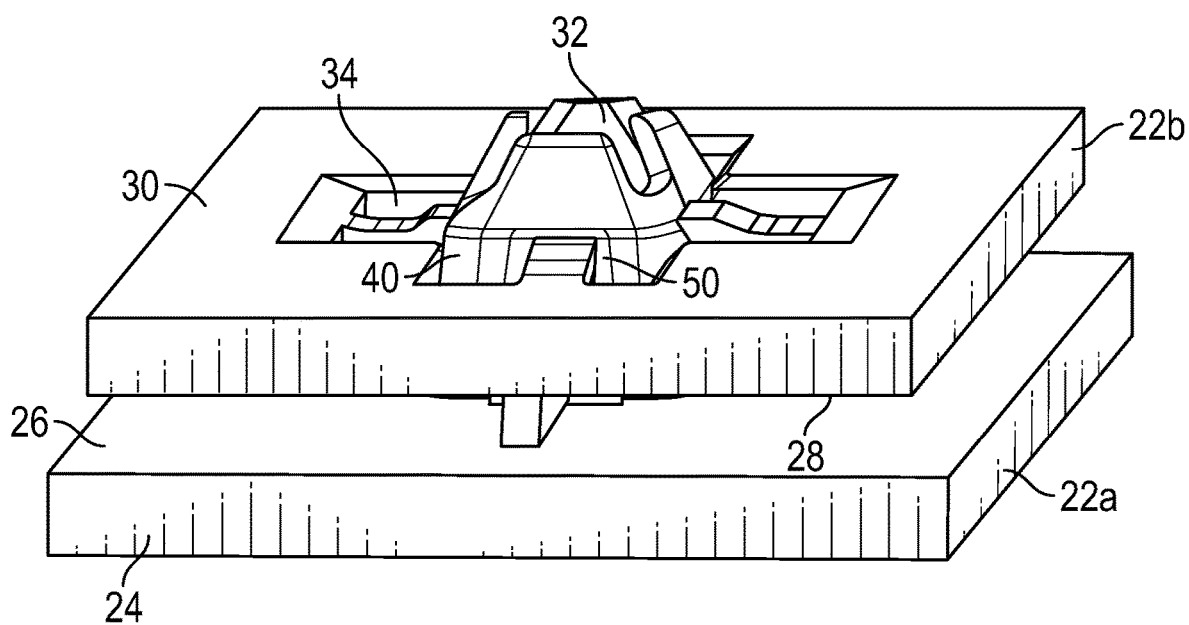
FIG. 3 is an illustration of an attachment of a first door trim piece to a second door trim piece.

Referring to FIG. 3, illustrated is an attachment of a first door trim piece 22a to a second door trim piece 22b. The first door trim piece 22a includes a first front surface 24 and a first back surface 26 opposite the first front surface 24. The second door trim piece 22b similarly includes a second front surface 28 and a second back surface 30 opposite the second front surface 28. When assembled, the first back surface 26 of the first door trim piece 22a abuts the second front surface 28 of the second door trim piece 22b. The first door trim piece 22a is retained to the second door trim piece 22b by one or more clips 32. The clips 32 each extend from the first back surface 26 of the first door trim piece 22a and extend through a clip opening 34 in the second door trim piece 22b when the first door trim piece 22a is installed to the second door trim piece 22b. In some embodiments, the clips 32 are formed integral to the first door trim piece 22a. While the clip 32 is described herein in the context of securing the first door trim piece 22a to the second door trim piece 22b, one skilled in the art will readily appreciate that the clip 32 may be utilized to join other components, for example, two plastic components, or to secure a plastic component to the vehicle body 2.

Figure 4:
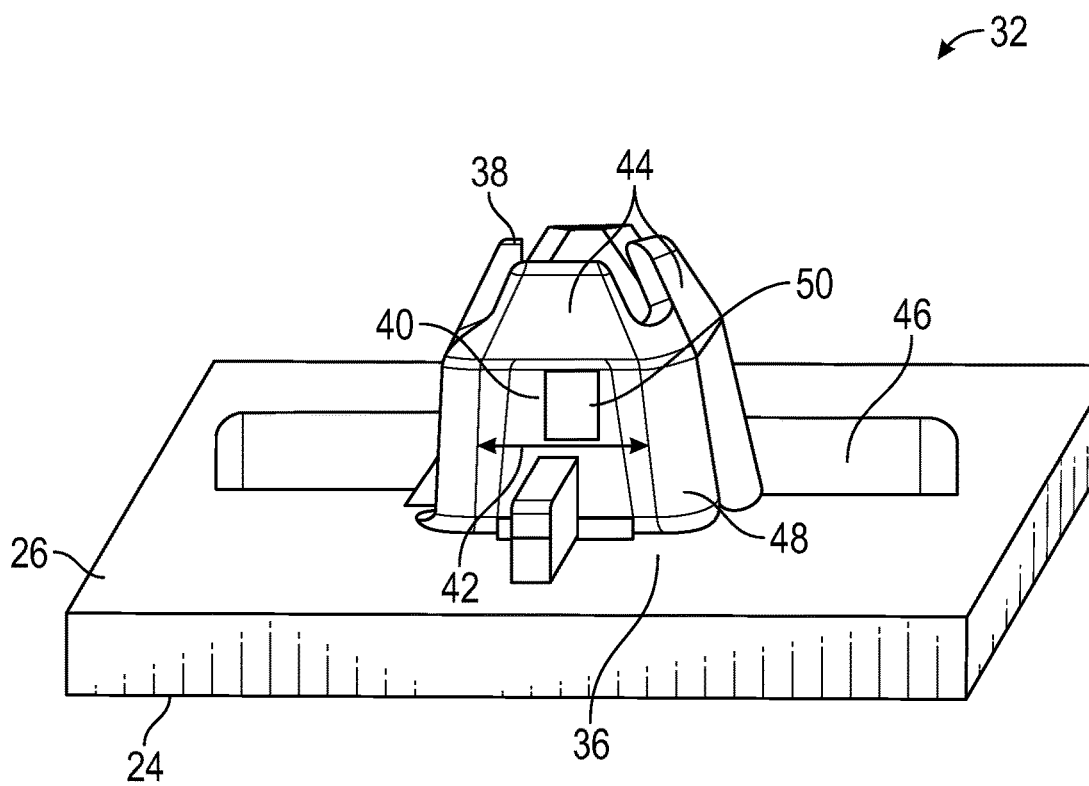
FIG. 4 is a perspective view of an embodiment of a clip of a door trim attachment.

Referring now to FIG. 4, the clip 32 extends from a clip base 36 at the first back surface 26 to a clip tip 38 defining an end of the clip 32. In some embodiments, the clip base 36 is square, and extends to the clip tip 38 defining four clip sides 40. While in the description and drawings herein, the clip base 36 is a square shape and the clip 32 has four clip sides 40, one skilled in the art will readily appreciate that other polygonal shapes may be utilized for the clip base 36, and thus the clip may have other numbers of clip sides 40. Each clip side 40 tapers in side width 42 from the clip base 36 to the clip tip 38, such that the side width 42 is greater at the clip base 38 than at the clip tip 38. The clip 32 is hollow and in some embodiments, the clip tip 38 is open, and each clip side 40 includes a side tab 44 located at the clip tip 38 which, together with the open clip tip 38 configuration aides in locating and guiding the clip 32 into the clip opening 34. In some embodiments, the side tabs 44 are, for example, trapezoidal or triangular in shape.

The clip 32 further includes one or more side ribs 46 at the clip sides 40, which extend from the first back surface 26 along the clip sides 40 to support the clip sides 40. In some embodiments, the clip 32 further includes one or more corner ribs 48, which extend along clip corners 50 defines at the intersection of adjacent clip sides 40. The corner ribs 48 further reinforce the clip 32 to support the clip 32 during installation of the clip 32 into the clip opening 34. Further, each clip side 40 has a side opening 50 formed therein and extending through the clip side 40. In some embodiments, the side opening 50 is rectangular in shape. The side openings 50 are utilized to retain the clip 32 at the clip opening 34 as is described below.

Figure 5:
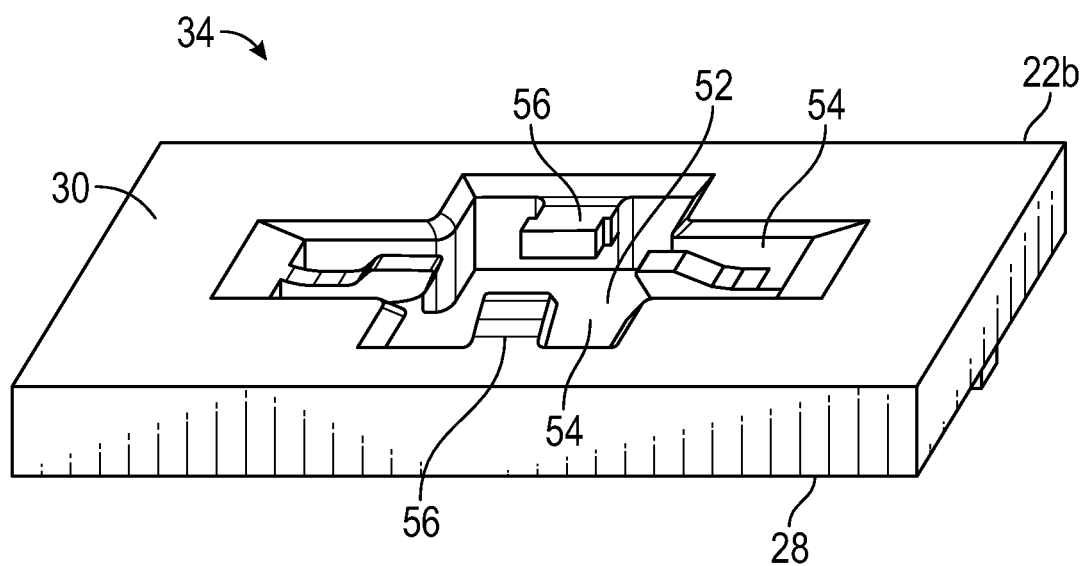
FIG. 5 is a perspective view of an embodiment of a clip opening into which the clip is installed.

Referring to FIG. 5, illustrated is an embodiment of a clip opening 34 in the second door trim piece 22b. The clip opening 34 is cross-shaped, with an opening central portion 52 and four opening branch portions 54 extending from the opening central portion 52. The opening central portion 52 is configured to receive the clip 32, so in some embodiments the opening central portion 52 is square shaped. In some embodiments, the opening branch portions 54 are rectangular but one skilled in the art will readily appreciate that other shapes may be utilized. An opening tab 56 is located in each of the opening branch portions 54 and extends toward the opening central portion 52.

Figure 6:
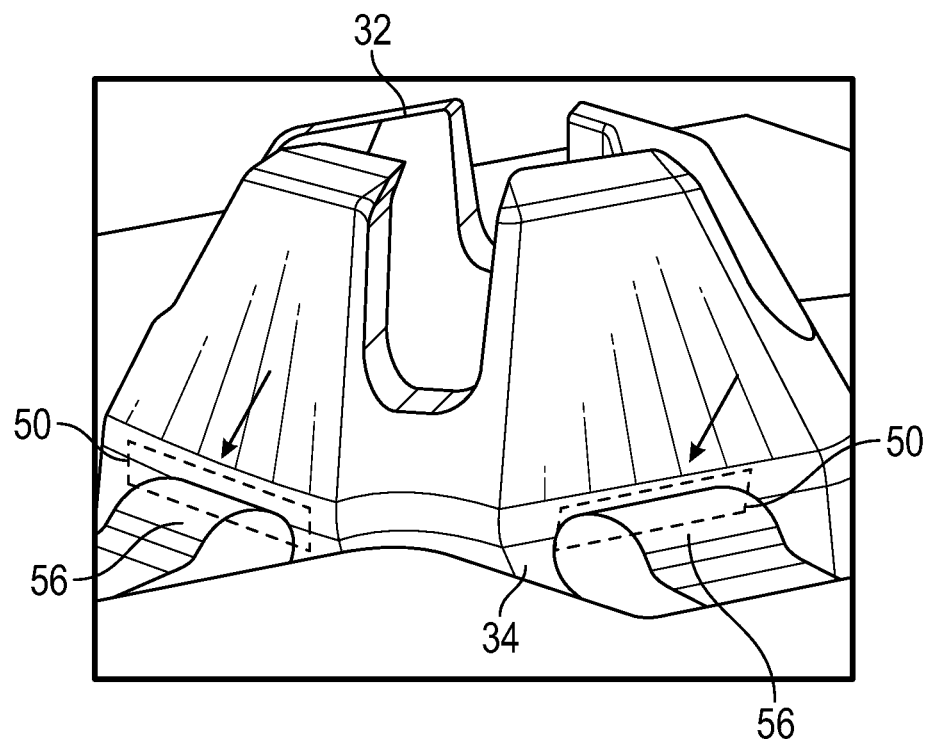
FIG. 6 is a perspective view of installation of an embodiment of a clip into a clip opening.

Referring now to FIG. 6, when the clip 32 is installed to the clip opening 34 the opening tabs 56 extend into the side openings 50 of the clip 32, and engage the side openings 50 to retain the clip 32 at the clip opening 34. The opening tabs 56 are flexible such that insertion force of the clip 32 into the clip opening 34 is low. In some embodiments the insertion force of the clip 32 into the clip opening 34 is 10 pounds force or less, while the retention force of the clip 32 in the clip opening 34 is 50 pounds force or more. The side openings 50 and the opening tabs 56 are easily tunable to adjust the insertion and retention forces, and to restrict relative movement of the first door trim piece 22a and the second door trim piece 22b. In some embodiments a thickness and or shape of the opening tabs 56 may be modified to increase flexibility of the opening tabs 56 thereby reducing an insertion force of the clip 32 into the clip opening 34. For example, reducing a thickness of the opening tabs 56 may increase flexibility of the opening tabs 56 to reduce the insertion force. Additionally or alternatively, changing a size of the side openings 50 relative to the opening tabs 56 may change the retention force. For example, increasing the size of the side openings 50 relative to the opening tabs 56 may reduce the retention force. While in some embodiments, the clips 32 and clip openings 34 may be tuned to the same insertion and retention force, in other embodiments, the clips 32 and clip openings 34 may be tuned to different insertion and retention forces at different locations of the door trim assembly. Further, the square shape of the clip 32 and the corresponding square shape of the opening central portion 52 restrict all degrees of freedom of the first door trim piece 22a relative to the second door trim piece 22b.

Figure 7:
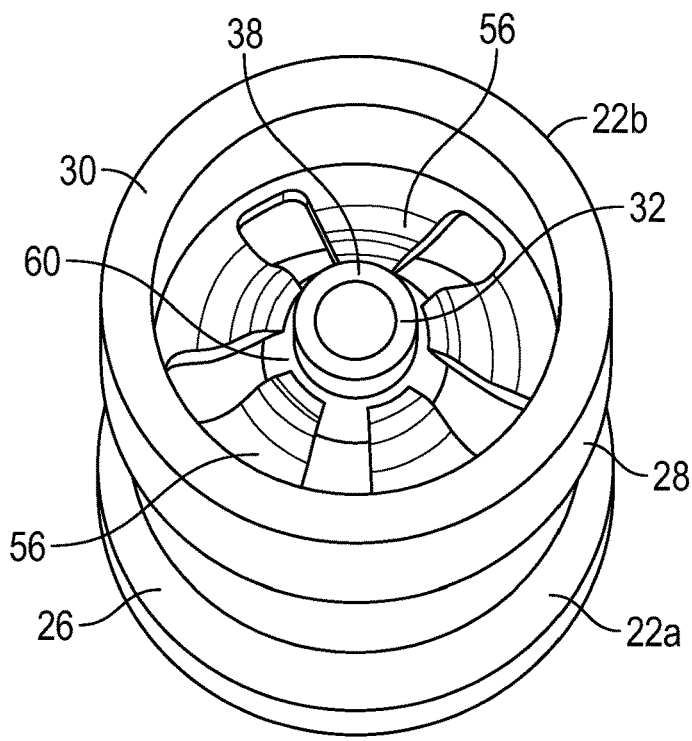
FIG. 7 is a perspective view of another embodiment of a clip installed into a clip opening.
Figure 8:
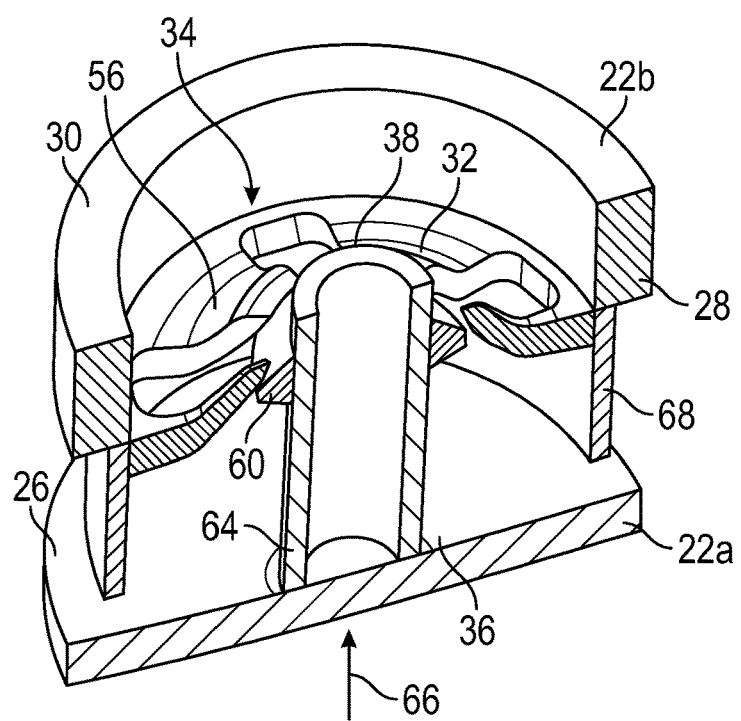
FIG. 8 is a partial cross-sectional view of an embodiment of a clip installed in a clip opening.

In other embodiments, referring now to FIGS. 7 and 8, the clip 32 and the clip opening 34 are each circular in shape, such that the clip 32 extends from a circular clip base 36 at the first back surface 26 to a circular clip tip 38 defining the end of the clip 32. The clip 32 further includes a clip ridge 60 extending around a clip body 64 between the clip base 36 and the clip tip 38. The clip ridge 60, shown best in FIG. 8, is in some embodiments triangular in cross-section. When the clip 32 is installed into the clip opening 34, by inserting the clip 32 into the clip opening 34 in an installation direction 66, the opening tabs 56 extending inwardly from the clip opening 34 engage with the clip ridge 60 to hold the clip 32 in the installed position in the clip opening 34. To prevent installing the clip 32 too far into the clip opening 34 in the installation direction 66, the second door trim piece 22b includes a clip stop 68 that protrudes from the second front surface 28 toward the first back surface 26. When the clip 32 is installed to the correct installed position, the clip stop 68 contacts the first back surface 26 to prevent further insertion of the clip 32 into the clip opening 34. In some embodiments, the clip stop 68 is circular and extends around a perimeter of the clip opening 34. It is to be appreciated, however, that this configuration is merely exemplary and other configurations of clip stops 68 may be utilized. For example, in other embodiments the clip stop 68 may include a plurality of segmented ribs extending from the second front surface 28 toward the first back surface 26.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A trim assembly of a vehicle, comprising:
    a first trim piece;
    a second trim piece;
    a clip extending from the first trim piece, the clip having:
        a base portion located at the first trim piece; and
        a tip portion;
    a clip opening disposed at the second trim piece, the clip opening having a complimentary shape into which the clip is installed, the clip opening including a plurality of opening tabs, each opening tab of the plurality of opening tabs engaged with a retention feature of the clip to retain the clip in the clip opening;
    wherein the clip has a polygonal cross-sectional shape having three or more clip sides;
    wherein each clip side of the three or more clip sides including a side opening configured as the retention feature to receive a corresponding opening tab of the plurality of opening tabs.

2. The trim assembly of claim 1, wherein the plurality of opening tabs are flexible to reduce an insertion force of the clip into the clip opening.

3. The trim assembly of claim 2, wherein the insertion force is 10 pounds force or less.

4. The trim assembly of claim 1, wherein the clip opening includes:
    an opening central portion into which the clip is installed; and
    a plurality of opening branch portions extending from the opening central portion;
    wherein each opening branch portion includes an opening tab of the plurality of opening tabs extending toward the opening central portion.

5. The trim assembly of claim 1, wherein a retention force of the clip in the clip opening is 50 pounds force or greater.

6. The trim assembly of claim 1, wherein the clip is formed integral with the first trim piece.

7. The trim assembly of claim 6, further comprising one or more reinforcing ribs extending from the first trim piece to the clip.

8. The trim assembly of claim 1, wherein a base cross-sectional area of the base portion is greater than a tip cross-sectional area of the tip portion.

9. A door assembly of a vehicle comprising:
    a door inner panel; and
    a door trim assembly installed to the door inner panel, the door trim assembly including:
        a first trim piece;
        a second trim piece;
        a clip extending from the first trim piece, the clip having:
            a base portion located at the first trim piece; and
            a tip portion;
        wherein a clip opening is disposed at the second trim piece, the clip opening having a complimentary shape into which the clip is installed, the clip opening including a plurality of opening tabs, each opening tab of the plurality of opening tabs engaged with a retention feature of the clip to retain the clip in the clip opening;
        wherein the clip has a polygonal cross-sectional shape having three or more clip sides;
        wherein each clip side of the three or more clip sides including a side opening configured as the retention feature to receive a corresponding opening tab of the plurality of opening tabs.

10. The door trim assembly of claim 9, wherein the plurality of opening tabs are flexible to reduce an insertion force of the clip into the clip opening.

11. The door trim assembly of claim 10, wherein the insertion force is 10 pounds force or less.

12. The door trim assembly of claim 9, wherein the clip opening includes:
    an opening central portion into which the clip is installed; and
    a plurality of opening branch portions extending from the opening central portion;
    wherein each opening branch portion includes an opening tab of the plurality of opening tabs extending toward the opening central portion.

13. The door trim assembly of claim 9, wherein a retention force of the clip in the clip opening is 50 pounds force or greater.

14. The door trim assembly of claim 9, wherein the clip is formed integral with the first trim piece.

15. The door trim assembly of claim 14, further comprising one or more reinforcing ribs extending from the first trim piece to the clip.

16. The door trim assembly of claim 9, wherein a base cross-sectional area of the base portion is greater than a tip cross-sectional area of the tip portion.

* * * * *